United States Patent
Obara

(10) Patent No.: US 6,252,822 B1
(45) Date of Patent: Jun. 26, 2001

(54) COUNTERMEASURE DEVICE WITH AIR BAG HOVER SYSTEM AND PRESSURE COMPENSATED ACOUSTIC PROJECTORS

(75) Inventor: Robert J. Obara, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/515,214

(22) Filed: Feb. 28, 2000

(51) Int. Cl.⁷ ........................................................ G01S 7/38
(52) U.S. Cl. ...................................................................... 367/1
(58) Field of Search ................................ 367/1, 144, 167, 367/172

(56) References Cited

U.S. PATENT DOCUMENTS

| | | |
|---|---|---|
| 3,771,115 * 11/1973 | Mclinden, Jr. | 367/1 |
| 4,194,246 * 3/1980 | Crist | 367/1 |
| 4,524,693 * 6/1985 | McMahon et al. | 367/167 |
| 5,103,432 * 4/1992 | Percy | 367/172 |
| 5,140,560 * 8/1992 | Percy | 367/167 |

\* cited by examiner

*Primary Examiner*—Daniel T. Pihulic
(74) *Attorney, Agent, or Firm*—Michael J. McGowan; Robert W. Gauthier; Prithvi C. Lall

(57) ABSTRACT

A countermeasure device which is supplied with air in order to actively compensate for external water pressure at any depth, is disclosed. The countermeasure includes an air bag hover system and one or more acoustic projectors, both of which are connected by an air line to a high pressure air source. A sensor is provided which measures the external water pressure and transmits the measurements to a microprocessor. Upon sensing an increased external water pressure, a pressure regulator valve is opened and air is supplied to both the acoustic projectors and the air bag in order to compensate for the increased water pressure. Similarly, if the external water pressure decreases, then air is released from both the air bag and the acoustic projectors through a pressure vent valve connected to the air bag. The microprocessor can also be programmed to vary the deployment depth of the device by varying the internal pressure within the device relative to the external water pressure.

18 Claims, 1 Drawing Sheet

COUNTERMEASURE DEVICE WITH AIR BAG HOVER SYSTEM AND PRESSURE COMPENSATED ACOUSTIC PROJECTORS

STATEMENT OF GOVERNMENT INTEREST

The invention described herein may be manufactured by or for the Government of the United States of America for governmental purposes without the payment of any royalties thereon or therefor.

BACKGROUND OF THE INVENTION (1) Field of the Invention

This invention relates generally to a countermeasure device, and more particularly to a countermeasure device including an air bag hover system and one or more low frequency acoustic projectors, both of which are supplied with air from a high pressure air source in order to actively compensate for external water pressure at any depth.

(2) Description of the Prior Art

The use of acoustic countermeasure devices in undersea warfare to protect submarines is common throughout the world. Such countermeasure devices are required to rise or lower at a predetermined rate, hover in place at a predetermined depth, and produce either a high or low frequency sound. Generally, high frequency sounds are emitted by countermeasure devices in order to disrupt a projectile such as a torpedo, while low frequency sounds are emitted to disrupt sonar. At low frequencies, such systems must move large amounts of water in order to produce the proper acoustics to shield the submarine, or to give the sonar multiple targets. A problem arises when utilizing such low frequency devices at depths of about 500 feet or more. Specifically, the acoustic projectors rapidly vibrate in order to produce the low frequency sound and, at deep sea, the external water pressure can interfere with such vibration, causing the sound emitted to be distorted or, in extreme cases, to fail completely. Therefore, countermeasure devices which operate at low frequencies are traditionally provided with a pressure compensating system in order to avoid depth limitations. For example, U.S. Pat. No. 4,524,693 to McMahon et al. discloses an underwater transducer including a water bladder assembly within the transducer which forms a passive internal pressure compensation system to protect the transducer against collapse under excessive ambient pressures. U.S. Pat. No. 5,103,432 to Percy discloses a low frequency, high powered underwater sound source including a housing having a loud speaker disposed therein. A bladder is disposed over the loud speaker which contains a pressurized, non-liquid sound transmission medium. Also disclosed is a fill system for filling the bladder with the sound transmission medium, a vent system for venting the bladder of the sound transmission medium, and a differential pressure sensor for comparing the pressure in the bladder with the ambient underwater pressure. U.S. Pat. No. 5,140,560 to Percy discloses an acoustic source apparatus including an acoustic transducer which is enclosed in a substantially rigid and watertight enclosure to resist the pressure of the water on the transducer and to seal the transducer from the water. The enclosure has an opening through which acoustic signals pass and over which is placed a resilient, expandable and substantially water-impermeable diaphragm. Pressurized gas, regulated at slightly above ambient pressure, is supplied to the enclosure and the diaphragm to compensate for underwater ambient pressures. Controls are used to selectively fill, as well as vent the enclosure and diaphragm during system descent and ascent, respectively.

While generally acceptable, such systems often utilize expensive electronics, air cylinders and valves for active pressure compensation, in addition to the hovering system which operates to move and hover the device in place. Such systems have increased weight (which can effect maneuvering), tend to be costly and, due to their complexity, may have reduced reliability.

There is therefore needed an improved countermeasure device for low frequency operation without depth limitation and which is lighter, less costly, and more reliable than existing countermeasure devices.

SUMMARY OF THE INVENTION

Accordingly, it is therefore an object of the present invention to provide a countermeasure device capable of low frequency operation without depth limitation.

It is another object of the present invention to provide a countermeasure device capable of low frequency operation without depth limitation which is lighter, less costly, and more reliable than existing low frequency countermeasure devices which operate without depth limitation.

This invention provides a countermeasure device including an air bag hover system and one or more low frequency acoustic projectors, both of which are supplied with air from a high pressure air source in order to actively compensate for external water pressure at any depth. In one embodiment, an air line is connected from the high pressure source to the acoustic projectors and the air bag whereby, upon sensing increased external water pressure, a pressure regulator valve is opened and air is supplied to both the acoustic projectors and the air bag in order to compensate for the increased water pressure. Similarly, if the external water pressure decreases, then air is released from both the air bag and acoustic projectors through a pressure vent valve connected to the air bag. A pressure sensor is provided which relays the sensed external water pressure to a microprocessor and then to either the pressure regulator valve or the pressure vent valve, as needed.

BRIEF DESCRIPTION OF THE DRAWING

The invention will be better understood and its attendent advantages will be readily appreciated by reference to the following detailed description and the appended drawing, wherein.

DESCRIPTION OF THE PREFERRED EMBODIMENT

Figure 1:
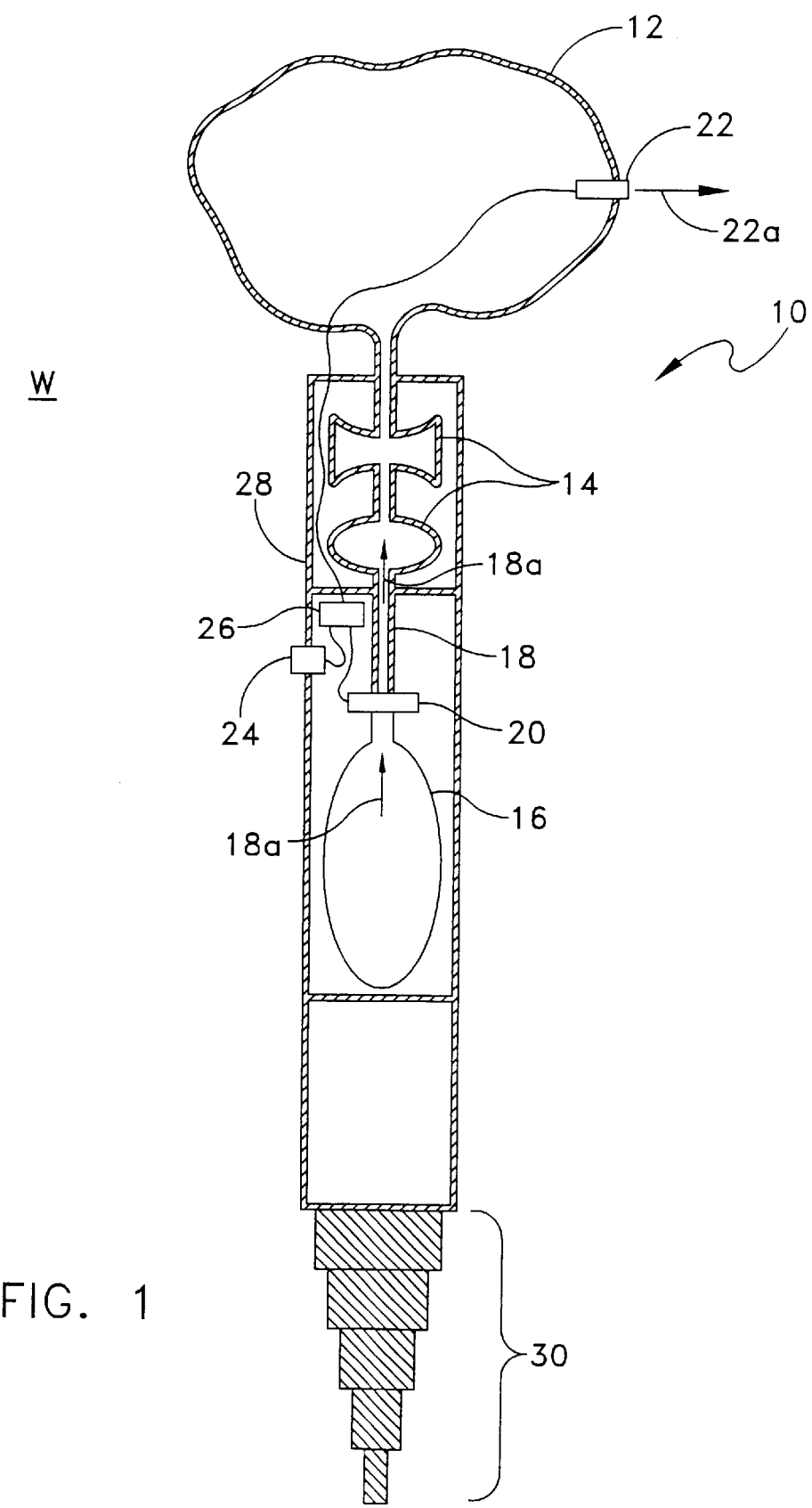
FIG. 1 is a cross-sectional side view of a countermeasure device with a pressure compensated air bag hover system and pressure compensated acoustic projectors.

Referring now to the figure, there is shown in FIG. 1 an air bag countermeasure device, generally indicated at 10, and submerged in an ocean environment W. The countermeasure device 10 utilizes an air bag hover system including an air bag 12 which brings the countermeasure device to a preprogrammed depth within environment W and hovers the device at that depth, and one or more acoustic projectors 14 which produce a low frequency sound during use. The countermeasure device also includes an air tank 16 which supplies high pressure air to both the air bag 12 and acoustic projectors 14. In the present embodiment, an air line 18 links the air bag and acoustic projectors to a pressure regulator valve 20 which is connected to the air tank 16. When an increase in air pressure within the air bag and/or acoustic projectors is needed, the pressure regulator valve 20 is opened and high pressure air flows through the air line 18 and into the acoustic projectors 14 and air bag 12 as shown by arrows 18a. Similarly, a pressure vent valve 22 is connected to the air bag such that when a decrease in air pressure within the air bag and/or acoustic projectors is needed, the pressure vent valve 22 is opened and air is released from within the countermeasure device as shown by arrow 22a.

In the present embodiment, a sensor 24 is provided which measures external water pressure, and any changes thereto. Upon sensing a change in the external water pressure, the sensor transmits a signal to a microprocessor 26 which processes the information and, if the water pressure has increased, relays a signal to open the pressure regulator valve 20, or if the water pressure has decreased, to open the pressure vent valve 22. The pressure regulator and vent valves can be used both to equalize the internal pressure of the system against the external water pressure and to selectively raise and/or lower the device, as desired. The sensor and microprocessor are conventional in design, such sensors and microprocessors for countermeasure devices being known to those of skill in the art.

The countermeasure device 10 also preferably includes a body portion 28 for housing the acoustic projectors, and other components of the device, such as the air tank. The air bag and acoustic projectors may be any known style (e.g. moving coil or flextensional projectors of any class) which are utilized in countermeasure devices, as are known to those of skill in the art. The countermeasure device may also include other electronics utilized to aid in the positioning and/or maneuvering of the device and may additionally include uncompensated acoustic projectors 30.

The operation of the countermeasure device 10 of the present invention will now be described. After deployment of the countermeasure device 10 according to known procedures, the device moves to a preprogrammed depth within environment W by either supplying additional air to the air bag 12 from the high pressure air tank 16 so as to raise the device 10, or by releasing air from the air bag 12 through the pressure vent valve 22 to lower the device 10 as controlled by microprocessor 26. Once at the proper depth, the air inside the air bag 12 must be equal to the external water pressure in order to maintain the countermeasure device 10 at its preprogrammed depth and, at deep sea, to prevent the acoustic projectors 14 from becoming damaged. Therefore, the pressure sensor 24 measures the external water pressure on the device 10 and transmits it to the microprocessor 26 so that the internal pressure may be adjusted accordingly. The microprocessor 26 relays the signal to either the pressure regulator valve 20 to increase the air pressure within the air bag 12 and acoustic projectors 14, or to the pressure vent valve 22 to decrease the air pressure, as needed, to equalize the internal and external pressures. Upon sensing a change in the external water pressure, the sensor 24 will again transmit a signal to the microprocessor 26 which processes the information and relays a signal to either the pressure regulator valve 20 or pressure vent valve 22 depending upon whether the external water pressure has increased or decreased. By continuously sensing the external water pressure and adjusting the pressure within the device 10 accordingly, the countermeasure device 10 provides active pressure compensation to both the air bag 12 and acoustic projectors 14

In addition, the microprocessor 26 can be programmed to vary the depth of the countermeasure device 10 during deployment. For example, the microprocessor 26 may be programmed to initially descend to a first depth, and thereafter to increase or decrease the depth of the device 10 in programmed increments, such as 50 feet each 30 minutes, or any other programmed rate of change in the descent or ascent of the device 10.

While there is shown and described herein certain specific structure embodying the invention, it will be manifest to those skilled in the art that various modifications and rearrangements of the parts may be made without departing from the spirit and scope of the underlying inventive concept. For example, the number and specific location of the pressure compensated acoustic projectors may be varied by one of skill in the art. In addition, although the pressure compensated acoustic projectors have been described as low frequency acoustic projectors, high frequency acoustic projectors could likewise be utilized in accordance with the invention. Therefore, the invention is not limited to the particular forms shown and described herein, except insofar as indicated by the scope of the appended claims.

What is claimed is:

1. A countermeasure device for undersea warfare, comprising:
   a hover system including an air bag for positioning the countermeasure device at a preprogrammed depth;
   at least one acoustic projector for transmitting a frequency; and
   a high pressure air source connected to both the air bag and the at least one acoustic projector, the high pressure air source supplying air to both the air bag and the at least one acoustic projector in order to equalize pressure within the countermeasure device against an external water pressure.

2. The countermeasure device of claim 1, wherein the high pressure air source is connected to the at least one acoustic projector and the air bag by an air line.

3. The countermeasure device of claim 2, further comprising a regulator valve connected to the air line and high pressure air source for selectively releasing air from the high pressure source to the air line so as to increase the air pressure within the countermeasure device.

4. The countermeasure device of claim 1, further comprising a sensor constructed and arranged to measure external water pressure on the countermeasure device.

5. The countermeasure device of claim 4, further comprising a microprocessor adapted to receive the measured external water pressure from the sensor, wherein the microprocessor relays a signal to a pressure regulator valve to increase the air pressure within the air bag and the acoustic projectors when the external water pressure is greater than the pressure within the countermeasure device.

6. The countermeasure device of claim 4, further comprising a microprocessor adapted to receive the measured external water pressure from the sensor, wherein the microprocessor relays a signal to a pressure vent valve to decrease the air pressure within the air bag and the acoustic projectors when the external water pressure is less than the pressure within the countermeasure device.

7. The countermeasure device of claim 1, further comprising a pressure vent valve for releasing air pressure from within the air bag.

8. The countermeasure device of claim 7, wherein the pressure vent valve is activated by a signal received from a sensor constructed and arranged to measure external water pressure on the countermeasure device.

9. The countermeasure device of claim 1, wherein the at least one acoustic projector is a low frequency acoustic projector.

10. The countermeasure device of claim 9, wherein the low frequency acoustic projector is a flextensional projector.

11. A method for actively equalizing pressure within a countermeasure device against an external water pressure comprising the steps of:
   providing a countermeasure device including an air bag, at least one acoustic projector, and a high pressure air supply;
   connecting the high pressure air supply to the air bag and the at least one acoustic projector;
   measuring the external water pressure; and
   activating a valve for regulating the pressure within the countermeasure device so as to equalize the pressure within the countermeasure device against the measured external water pressure.

12. The method of actively equalizing pressure within a countermeasure device of claim 11, wherein the measured external water pressure is transmitted to a microprocessor so as to selectively regulate the pressure within the countermeasure device.

13. The method of claim 12, wherein selectively regulating the pressure within the countermeasure device varies the depth of the device.

14. The method of actively equalizing pressure within a countermeasure device of claim 11, wherein the valve is a regulator valve connected to the high pressure air source for selectively releasing air from the high pressure source so as to increase the air pressure within the air bag and at least one acoustic projector.

15. The method of actively equalizing pressure within a countermeasure device of claim 11, wherein the valve is a pressure vent valve connected to the air bag for selectively releasing air in order to decrease the air pressure within the countermeasure device.

16. The method of actively equalizing pressure within a countermeasure device of claim 11, further comprising the steps of:
   transmitting the measured external water pressure to a microprocessor;
   determining if the internal pressure requires adjustment; and
   activating one of a regulator valve for increasing the pressure within the countermeasure device and a pressure vent valve for decreasing the pressure within the countermeasure device.

17. The method of claim 11, further comprising the step of programming a microprocessor to selectively vary the depth of the countermeasure device within the water.

18. The method of claim 17, wherein the depth of the device is varied in pre-programmed increments over a period of time.

* * * * *